July 15, 1952  H. J. WADDELL ET AL  2,603,448
LUBRICATED PLUG VALVE
Filed Jan. 28, 1948
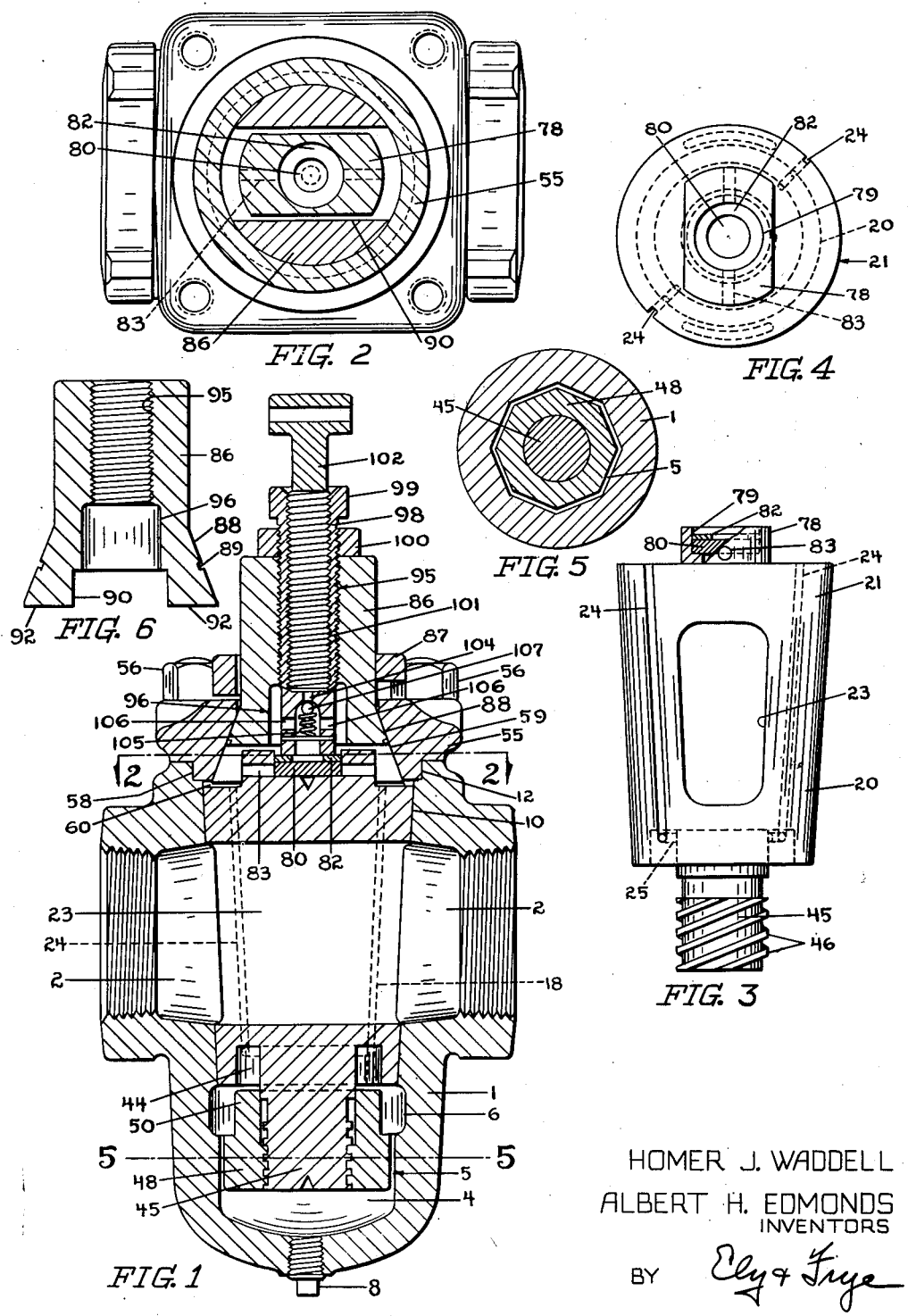
HOMER J. WADDELL
ALBERT H. EDMONDS
INVENTORS
BY Ely & Frye
ATTYS.

Patented July 15, 1952

2,603,448

UNITED STATES PATENT OFFICE 2,603,448

LUBRICATED PLUG VALVE

Homer J. Waddell, Baltimore, and Albert H. Edmonds, Lancaster, Ohio, assignors, by mesne assignments, to The Waddell Manufacturing Company, Inc., a corporation of Ohio Original application August 30, 1946, Serial No. 693,897, now Patent No. 2,596,963, dated May 13, 1952. Divided and this application January 28, 1948, Serial No. 4,898

2 Claims. (Cl. 251—93)

The present invention is directed to improvements in lubricated plug valves in which the valve surfaces are lubricated with each operation of the valve, the rotation of the valve forcing the lubricant over the valve seating surfaces.

This application is a division of applicants' prior application, Serial No. 693,897, filed August 30, 1946, which matured to Patent No. 2,596,963 on May 13, 1952, which application is directed to the features of forced lubrication by which the lubricant is circulated over the contacting surfaces of the plug and valve body and across the top of the plug to and from the main lubricating reservoir which is conveniently located in the base of the valve housing.

The present application is directed to one form of valve originally shown in such application which is characterized by making the plug and the stem by which it is turned in two parts keyed together, it being desirable in certain cases to make the valve of this general design. The organization shown herein also provides for better sealing of the upper end of the housing so that the lubricant is retained within the valve assembly.

While this application is directed to the features particularly set forth, it will be necessary to describe the complete valve structure in sufficient detail so that the invention will be understood.

The best known and preferred form of the invention is shown in the drawings and will be described in detail in the specification, but it will be understood that this is for the purpose of making a full and complete disclosure and not to limit the invention to the exact form or details so shown and described.

In the drawings:

Fig. 1 is a vertical section through the complete valve assembly, the valve being shown in open position;

Fig. 2 is a section on the line 2—2 of Fig. 1;

Fig. 3 is a side view and Fig. 4 a plan view of the plug removed from the housing;

Fig. 5 is a section on the line 5—5 of Fig. 1; and

Fig. 6 is a vertical section of the stem taken on a plane at right angles to Fig. 1.

While the valve shown and described herein is characterized by the provision of a plunger or piston in screw-threaded relation to the rotatable plug and so mounted that with each rotation of the plug the piston makes a complete stroke, up or down, in the reservoir filled with the lubricant, the present invention is not necessarily limited to that type of valve, but may be applied to other lubricated valves. In the drawings the plug and its seating surface are shown conical in form, and although this is preferred, it is optional. Where the term "upper" and "lower" are employed, these are relative merely as the valve may be located in any position.

The valve body 1 is of any usual or typical form, that shown herein having the oppositely positioned ports 2 which provide the flow passage through the body. The body is provided at its lower end with an enlarged chamber, indicated as a whole by the numeral 4, which may be termed the main lubricant reservoir. A portion of the wall of this chamber is formed with a non-circular cross-section so as to provide for the actuation of the piston in the manner to be described. In the drawings this portion of the reservoir is indicated at 5 and is shown as octagonal in form, although this particular configuration is optional.

Above the octagonal surfaces, the chamber is enlarged, as at 6, so as to give increased capacity for the lubricant chamber. The lower end of the chamber is provided with a clean-out passage, normally closed by a removable threaded plug 8.

From the upper end of the reservoir to a point close to the top, the body is formed with the machine finished valve seating surface 10 which is shown as conical with the larger portion of the surface toward the top of the valve. At the top of the seating surface, the valve body is cut away to provide a surface 12 angular in cross-section, in which the bonnet, to be described, is seated and centered.

In the valve seating surface 10 are cut two vertical grooves or channels 18 which extend from the reservoir 6 to the seat 12. One of these channels is shown in dotted lines in Fig. 1. The channels are located 180° apart and close to the respective ports 2.

The plug, which constitutes the rotatable member of the valve is indicated as a whole at 20. The main or central portion of the plug is enlarged and provided with a machined surface 21 fitting closely against the seat 10 in the valve body. A through passage 23 in the body registers with the passage 2 when the valve is opened. In the surface 21 on the plug are located the two lubricant conducting grooves 24 which are located, as shown in Figs. 3 and 4, as 180° apart. As shown in Fig. 1, the grooves of each pair of lubricant grooves 18 and 24 are located on opposite sides of a port 2 when the valve is open, which, with the lubricant chambers at the top and bottom of the main body of the plug make complete lubricant seals around the two passages 2 when the valve is open. As the plug is turned each passage 24 wipes over substantially one half of the seating area 10.

Each groove 24, in the form shown, extends from the top of the plug body to a point near the base of the plug body where it communicates with an internal radially arranged passage 25. These passages 25 communicate with an annular pocket or chamber 44 cut into the lower under surface of the plug body. The vertical walls of this chamber are finished so they have a relatively close sliding contact with the pistons, to be described.

On the axis of the plug is provided the depending stem or extension 45 which projects downwardly into the chamber 4. The outer surface of this extension is cut with a relatively steep thread 46 over most of its length. This is preferably a square cut, multiple thread and its pitch is dependent upon the extent to which the piston is to move in a quarter turn of the plug. In all types of valves, the thread is designed to impart a substantial travel to the piston during the short arcuate movement of 90° required to open and close the valve.

The piston or plunger is designated by the numeral 48. It is threaded on the extension 45 and its outer surface is formed as a polygon roughly fitting the socket 5 formed in the inner wall of the main reservoir. As shown in Fig. 1, this is a loose fit so that grease may flow around the piston, but it is sufficient to constitute a key between the piston and the body so that the piston will rise and fall in the reservoir as the plug is turned. The upper surface of the piston is provided with an annular, upstanding rib 50, the walls of which are finished so that they have a close sliding fit with the walls of the pocket 44, at least sufficiently close so that grease trapped with the chamber 44 will be forced by the upward movement of the piston through the grease grooves and passage over the valve seating surfaces. It will be noted from Fig. 1 that when the valve is fully opened, the upper surface of the rib 50 lies slightly below the entrance to the pocket 44 so that the valve will turn over a short arc before the piston enters the pocket. This distance in the open position of the valve may be of any depth, depending upon the amount of lubricant which it is desired to circulate over the valve surfaces.

On the top of the housing is located the bonnet 55 which is secured to the valve body by the bolts 56, the lower end of the bonnet being formed with a rib 58 which fits snugly within the seat 12, the contacting surfaces being finished so that no grease may seep out around the top of the housing. The inner surface of the bonnet is tapered or conical as shown at 59 and the space between the top of the plug and the inner surface of the bonnet provides a secondary lubricant chamber 60 with which the several lubricant channels 24 and 18 are in communication.

The upper end of the plug is formed with an upstanding rib or key 78 parallel to the passage 23 and having two parallel sides as shown in Fig. 2. This rib is somewhat shorter than the diameter of the top of the plug so as to provide space in the lubricant chamber 60. Located in the center of the rib is a round socket 79 in the base of which is inserted a disk 80 which is made from a yielding packing material. While a wide variety of materials may be used for this packing disk, it is preferred to employ a standard asbestos packing which has a limited resilience.

Over the top of the disk is located a washer 82 which is designed to take the direct thrust on the packing disk. Radial breather holes 83 lead from the socket 79.

The stem is indicated as a whole by the numeral 86. The main portion of the stem which extends above the bonnet is non-circular, preferably square so as to provide means by which the stem may be turned, and over this squared portion is fitted the stop collar 87 which cooperates with lugs placed 90° apart on the bonnet to limit the movement of the plug in opening and closing the valve as is well known in the art. The lower portion of the stem is flared outwardly to form the conical surface 88 which is of the same contour as the inside surface 59 on the bonnet. A grease groove 89 is formed in the conical surface of the stem to form a continuous grease seal between the bonnet and the stem. The undersurface of the stem is provided with a broad, transverse kerf 90 which provides two feet 92 which span the rib 78 and thereby transmit turning movement of the stem to the plug.

Axially located in the upper part of the stem is a screw-threaded bore 95, the lower end of which opens into an enlarged chamber 96 open at the lower end and designed to receive the lubricant. In the bore 95 is a long sleeve 98, the major portion of which is threaded interiorly and exteriorly. The upper end of this sleeve extends above the top of the stem 86 and is formed as a nut 99 by which the sleeve may be rotated. A lock nut 100 on the sleeve and bearing against the top of the stem holds the sleeve in its adjusted position.

The interior of the sleeve constitutes a lubricant receiving passage 101 and in the sleeve is threaded the lubricant feed screw 102 by which the grease is fed into the valve. The lower end of the sleeve 98 forms the bottom for the passage 101, an opening 104 at the base of the passage leading to a recess 105 from which radial passages 106 conduct the lubricant to the chamber 96. A spring-pressed ball check valve 107 prevents the lubricant from returning to the passage 101. The lower end of the sleeve 98 bears against the washer 82 and holds the plug on its seat with any degree of pressure which may be desired by the vertical adjustment of the sleeve 98 in the valve stem. It will be noted, however, that the pressure of the sleeve is placed directly upon the compressible disk 80 which acts as a pad to take up excessive pressures and avoids accidental breakage due to too vigorous advancement of the sleeve. It will also be noted that the pressure exerted on the head of the plug reacts through the sleeve to force the conical surfaces 59 and 88 together so that the tightening of the sleeve 98 serves both to force the plug onto its seating surface in the valve body, but also to make a grease-tight seal between the stem and the bonnet. This pressure is yielding because of the presence of the pad 80.

When the plug is assembled, the lubricant fills all of the chambers and grooves, and upon rotation of the plug the circulation of the grease over the valve seating surfaces through the grooves 18 and 24 and across the top of the plug to and from the main reservoir 4.

The embodiment of the invention has been described in great detail, but these details are not essential and may be varied or modified within the scope of the invention as set forth in the appended claims.

What is claimed is:

1. A lubricated valve comprising a valve body provided with a valve seat open at one end, a rotatable plug in the seat, a bonnet secured to the valve body and overlying the seat, said bonnet being spaced from the top of the plug to provide a lubricant chamber over the top of the plug, a bearing seat in the top of the plug, a valve stem rotatable in the bonnet and having a lubricant sealing surface in contact with the bonnet, a keyed connection between the valve stem and the plug, a hollow sleeve threaded into the stem, the inner end of the sleeve projecting into the chamber and bearing against the seat in the top of the plug, said sleeve constituting a lubricant channel and a lateral passage near the inner end of the sleeve and leading from the interior of the sleeve to the chamber to conduct lubricant into the chamber.

2. A lubricated valve comprising a valve body provided with a valve seat open at one end, a rotatable tapered plug in the seat, a bonnet secured to the valve body and over-lying the seat, said bonnet being spaced from the top of the plug to provide a lubricant chamber over the top of the plug, the bonnet having a conical seat facing the plug, a valve stem rotatable in the bonnet and having a conical surface mating with the conical seat on the bonnet, a keyed connection between the valve stem and the plug, a bearing seat in the top of the plug, and a one-piece thrust member threaded into the stem, the inner end of the thrust member projecting into the chamber and bearing against the seat in the top of the plug, the thrust member having an axial lubricant passage leading from the outer end of the member to a point adjacent its inner end, and a lateral passage extending from the passage and opening into the lubricant chamber at the top of the plug.

HOMER J. WADDELL.
ALBERT H. EDMONDS.

REFERENCES CITED

The following references are of record in the file of this patent:

UNITED STATES PATENTS

| Number | Name | Date |
|---|---|---|
| 1,624,512 | Shipley | Apr. 12, 1927 |
| 2,025,244 | Morehead et al | Dec. 4, 1935 |
| 2,062,068 | Nordstrom | Nov. 24, 1936 |
| 2,483,518 | Bettcher | Oct. 4, 1949 |
| 2,552,375 | Haun | May 8, 1951 |